United States Patent
Williams et al.

(10) Patent No.: US 12,454,915 B2
(45) Date of Patent: Oct. 28, 2025

(54) FORCE MODIFICATION OF PASSIVE VALVE SPOOLS FOR CONTROL OF NOZZLES

(71) Applicant: Hamilton Sundstrand Corporation, Charlotte, NC (US)

(72) Inventors: Brandon P. Williams, Johnston, IA (US); Jason A. Ryon, Carlisle, IA (US); Murtuza Lokhandwalla, South Windsor, CT (US); Todd Haugsjaahabink, Amherst, MA (US); Charles E. Reuter, Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 308 days.

(21) Appl. No.: 17/896,522

(22) Filed: Aug. 26, 2022

(65) Prior Publication Data

US 2024/0068404 A1 Feb. 29, 2024

(51) Int. Cl.
*F02C 7/232* (2006.01)
*F02C 7/22* (2006.01)
*F16K 31/06* (2006.01)
*F16K 31/08* (2006.01)

(52) U.S. Cl.
CPC ............ *F02C 7/232* (2013.01); *F02C 7/222* (2013.01); *F16K 31/0613* (2013.01); *F16K 31/0679* (2013.01); *F16K 31/082* (2013.01); *F05D 2260/60* (2013.01)

(58) Field of Classification Search
CPC ...... F02C 7/232; F02C 7/222; F16K 31/0613; F16K 31/0679; F16K 31/082; F05D 2260/60
See application file for complete search history.

(56) References Cited

U.S. PATENT DOCUMENTS

| | | | |
|---|---|---|---|
| 3,728,859 A | 4/1973 | Seiler | |
| 4,655,912 A | 4/1987 | Bradley et al. | |
| 4,726,396 A | 2/1988 | Bradley et al. | |
| 4,817,389 A | 4/1989 | Holladay et al. | |
| 4,962,887 A | 10/1990 | Matsuoka | |
| 5,108,070 A * | 4/1992 | Tominaga | H01F 7/1615 251/129.1 |
| 5,257,502 A | 11/1993 | Napoli | |

(Continued)

FOREIGN PATENT DOCUMENTS

| | | |
|---|---|---|
| EP | 2497923 A2 | 9/2012 |
| EP | 3460334 A1 | 3/2019 |
| GB | 1300831 A | 12/1972 |

OTHER PUBLICATIONS

Extended European Search Report for EP Application No. 23193608.9, Dated Jan. 30, 2024, pp. 8.

(Continued)

*Primary Examiner* — Steven M Sutherland
(74) *Attorney, Agent, or Firm* — Kinney & Lange, P.A.

(57) ABSTRACT

A system includes an injector having a scheduling valve assembly and a nozzle in fluid communication with the valve assembly. The scheduling valve assembly is configured for regulation of flow from an inlet of the injector to the nozzle. An electromagnetic device is operatively connected to a hydromechanical valve spool of the valve assembly to selectively adjust position of the valve spool in the valve assembly.

16 Claims, 2 Drawing Sheets

(56) References Cited

U.S. PATENT DOCUMENTS

| | | |
|---|---|---|
| 5,339,636 A | 8/1994 | Donnelly et al. |
| 5,417,054 A | 5/1995 | Lee et al. |
| 5,732,730 A | 3/1998 | Shoemaker et al. |
| 5,735,117 A | 4/1998 | Toelle |
| 6,119,960 A | 9/2000 | Graves |
| 7,255,290 B2 | 8/2007 | Bright et al. |
| 8,316,630 B2 | 11/2012 | Futa et al. |
| 8,347,599 B2 | 1/2013 | Scully |
| 8,387,400 B2 | 3/2013 | Goeke et al. |
| 8,483,931 B2 | 7/2013 | Williams et al. |
| 8,666,632 B2 | 3/2014 | Zebrowski et al. |
| 8,677,754 B2 | 3/2014 | Lueck et al. |
| 8,807,463 B1 | 8/2014 | McAlister |
| 8,820,087 B2 | 9/2014 | Ryan |
| 9,121,349 B2 | 9/2015 | Griffiths et al. |
| 9,234,465 B2 | 1/2016 | Futa et al. |
| 9,488,107 B2 | 11/2016 | Rodrigues et al. |
| 9,494,079 B2 | 11/2016 | Pousseo et al. |
| 9,840,992 B2 | 12/2017 | Duncan et al. |
| 10,041,411 B2 | 8/2018 | Chabaille et al. |
| 10,174,948 B2 | 1/2019 | Hill |
| 10,288,294 B2 | 5/2019 | Griffiths et al. |
| 10,408,131 B2 | 9/2019 | Thompson et al. |
| 10,465,908 B2 | 11/2019 | Stevenson et al. |
| 10,487,957 B2 | 11/2019 | Bleeker et al. |
| 10,502,138 B2 | 12/2019 | Reuter et al. |
| 10,982,858 B2 | 4/2021 | Bickley |
| 11,067,278 B2 | 7/2021 | Prociw et al. |
| 11,215,121 B2 | 1/2022 | Stevenson |
| 11,371,439 B2 | 6/2022 | Di Martino et al. |
| 11,408,347 B2 | 8/2022 | Reuter et al. |
| 11,408,348 B2 | 8/2022 | Culwick |
| 11,421,600 B1 | 8/2022 | Reuter et al. |
| 11,549,687 B2 | 1/2023 | Griffiths et al. |
| 11,643,970 B2 | 5/2023 | Baker et al. |
| 2003/0093998 A1 | 5/2003 | Michau et al. |
| 2005/0224598 A1 | 10/2005 | Potz et al. |
| 2006/0144964 A1 | 7/2006 | Boecking |
| 2006/0236974 A1 | 10/2006 | Randall |
| 2009/0173810 A1 | 7/2009 | Rodrigues et al. |
| 2009/0204306 A1 | 8/2009 | Goeke et al. |
| 2009/0234555 A1 | 9/2009 | Williams et al. |
| 2009/0277185 A1 | 11/2009 | Goeke et al. |
| 2010/0005776 A1 | 1/2010 | Lueck et al. |
| 2010/0037615 A1 | 2/2010 | Williams et al. |
| 2010/0050593 A1 | 3/2010 | Futa et al. |
| 2010/0058770 A1 | 3/2010 | Ryan |
| 2012/0227842 A1* | 9/2012 | Griffiths .................. F02C 9/34 137/561 A |
| 2012/0261000 A1 | 10/2012 | Futa et al. |
| 2013/0042920 A1 | 2/2013 | Snodgrass et al. |
| 2013/0061599 A1 | 3/2013 | Van Alen |
| 2013/0125556 A1* | 5/2013 | Hoke .................... F02C 7/228 60/773 |
| 2014/0034023 A1 | 2/2014 | Coldren |
| 2014/0311455 A1 | 10/2014 | Kim et al. |
| 2015/0096301 A1 | 4/2015 | Chabaille et al. |
| 2015/0292412 A1 | 10/2015 | Rodrigues et al. |
| 2016/0017808 A1 | 1/2016 | Chabaille et al. |
| 2016/0230904 A1 | 8/2016 | Zarrabi et al. |
| 2016/0298851 A1 | 10/2016 | Brickwood et al. |
| 2016/0325843 A1* | 11/2016 | Ripley .................... F02C 7/232 |
| 2017/0268781 A1 | 9/2017 | Stevenson et al. |
| 2018/0066588 A1 | 3/2018 | Daly et al. |
| 2018/0163635 A1 | 6/2018 | Marocchini et al. |
| 2018/0163637 A1 | 6/2018 | Griffiths |
| 2018/0163966 A1 | 6/2018 | Jones et al. |
| 2018/0291831 A1 | 10/2018 | Hirano |
| 2018/0372321 A1 | 12/2018 | Yates et al. |
| 2018/0372323 A1 | 12/2018 | Griffiths |
| 2021/0017908 A1 | 1/2021 | Di Martino et al. |
| 2021/0018177 A1 | 1/2021 | Griffiths et al. |
| 2023/0050741 A1 | 2/2023 | Xuening et al. |

OTHER PUBLICATIONS

First Communication Pursuant to Article 94(3) EPC for EP Application No. 23193608.9, Dated Jan. 3, 2025, pp. 6.

* cited by examiner

FORCE MODIFICATION OF PASSIVE VALVE SPOOLS FOR CONTROL OF NOZZLES

BACKGROUND

1. Field

The present disclosure relates to injectors and nozzles, and more particularly to fuel injection such as in gas turbine engines.

2. Description of Related Art

Conventional fuel injectors that contain flow scheduling valves are passive, where the flow response is fully based on the input pressure. A resistive spring provides the force balance to limit the rate at which the schedule valve opens. These valves can be used to divide flow as well, providing multiple flow paths that can be sequenced/schedule based on inlet fuel pressure, valve open area, and any downstream flow devices such as atomizers. At relatively low flow conditions, the flow schedule valve is largely responsible for most of the metering and therefore consumes/requires the majority of the fuel pressure. At relatively high flow conditions, there is a transition of pressure drop from the valve to other components downstream of the valve. Gas turbine combustors will typically have a natural frequency that may become excited when a certain heat release is attained. Quite often, this is at ground conditions; however, it can also be a concern at multiple flow conditions. This condition can cause significant levels of noise and occasionally may negatively impact the health of the structural components within and around the combustor.

To mitigate this noise, adjustments to fuel scheduling may be directed, in an attempt to decouple the heat release and noise; however, these attempts require additional flow dividing hardware and fuel manifolds adding significant cost, weight, and power requirements.

The conventional techniques have been considered satisfactory for their intended purpose. However, there is an ever present need for improved systems and methods for adjusting flow in passive injection valves. This disclosure provides a solution for this need.

SUMMARY

A system includes an injector having a scheduling valve assembly and a nozzle in fluid communication with the valve assembly. The scheduling valve assembly is configured for regulation of flow from an inlet of the injector to the nozzle. An electromagnetic device is operatively connected to a hydromechanical valve spool of the valve assembly to selectively adjust position of the valve spool in the valve assembly.

The injector can include two fluid circuits between the inlet of the injector and two respective outlets of the nozzle for staged flow output from the nozzle. A first one of the two fluid circuits can be a primary circuit, and a second one of the two fluid circuits can be a secondary circuit. The valve spool can be biased to a closed position by one or more biasing members of the scheduling valve assembly. The valve spool can be configured to regulate flow from the inlet of the injector to each of the primary and secondary circuits. The valve spool can include a scheduling surface configured to vary flow area through the secondary circuit based on position of the valve spool within the scheduling valve assembly.

The electromagnetic device can include a permanent magnet mounted on the valve spool. An electromagnet can be mounted to the valve assembly proximate to the permanent magnet for selectively applying a force to the permanent magnet to adjust position of the valve spool within the valve assembly.

The permanent magnet can be a first permanent magnet and the electromagnet can be a first electromagnet. The first permanent magnet and the first electromagnet can be mounted proximate a downstream end of the valve assembly. The electromagnetic device can include a second permanent magnet mounted to the valve spool at a position upstream relative to the first permanent magnet. A second electromagnet can be mounted to the valve assembly proximate the second permanent magnet at a position in the valve assembly upstream relative to the first electromagnet.

The first permanent magnet and first electromagnet can have respective polarities and axial spacing relative to one another configured to pull the valve spool toward a downstream direction with application of DC current to the first electromagnet. The second permanent magnet and second electromagnet can have respective polarities and axial spacing relative to one another configured to pull the valve spool in an upstream direction with application of DC current to the second electromagnet.

The electromagnetic device can include a linear electromagnetic motor including a stator mounted to stationary relative to the injector. The stator can include a plurality of electromagnetic coils spaced apart from one another along a motion axis of the valve spool. A linear rotor can be mounted to the valve spool. The linear rotor can include at least one permanent magnet positioned within the stator. The stator and linear rotor can be configured to adjust position of the valve spool within the valve assembly based on electrical currents supplied to the plurality of electromagnetic coils. A sensor can operatively connect the valve assembly to a controller of the electromagnetic device to provide feedback of operational state of the valve assembly.

The injector can be a first injector in a plurality of injectors each connected in fluid communication with a single manifold for supplying fuel to each injector in the plurality of injectors. A first sub-set of the plurality of injectors can be passive, simplex nozzles configured to issue fuel together with the secondary circuit of the first injector. The first injector can be a first injector in a second sub-set of the plurality of injectors. Each injector in the second sub-set can be as described above including a respective electromagnetic device as described above connected thereto.

A controller can be electrically connected to the electromagnetic devices for individual control thereof. A controller can be electrically connected to the electromagnetic devices for ganged control thereof. The first sub-set of injectors can be grouped circumferentially offset from the second sub-set of injectors.

The electromagnetic device and valve form a binary valve, a modulating valve, or a motorized valve. Loss of electrical power to the electromagnetic device can cause the valve spool to return to a position determined by mechanical components and regulates fuel flow as per a scheduling surface.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
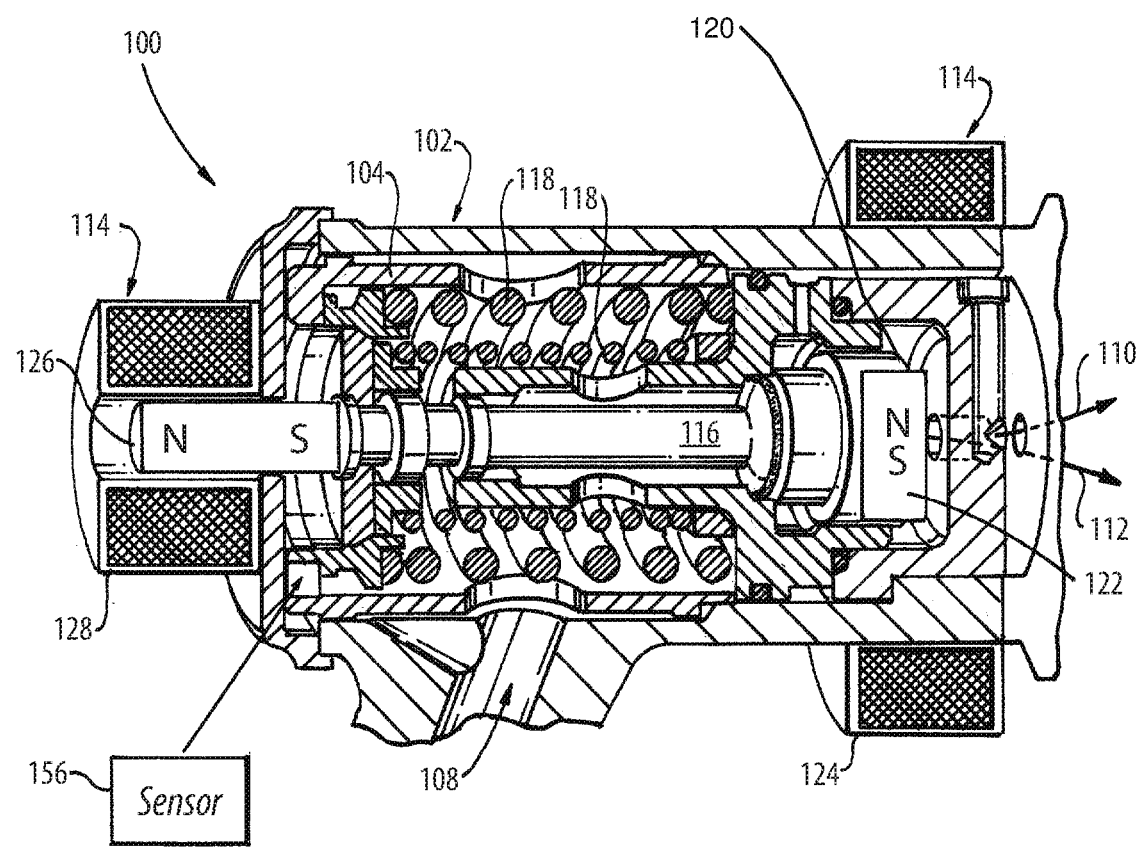
FIG. 1 is a schematic cross-sectional perspective view of a portion an embodiment of a system constructed in accordance with the present disclosure, showing the electromagnetic device connected to adjust position of the otherwise passive hydromechanical valve spool.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide adjustment of otherwise passive valves, e.g. to provide active patternation in fuel injection for gas turbine engines.

The system 100 includes an injector 102 having a scheduling valve assembly 104 and a nozzle 106 (labeled in FIG. 2) in fluid communication with the valve assembly 104. The scheduling valve assembly 104 is configured for regulation of flow from an inlet 108 of the injector 102 to the nozzle 106 (labeled in FIG. 2). The injector 102 includes two fluid circuits 110, 112 between the inlet 108 of the injector and two respective outlets 106a, 106b of the nozzle 106 for staged flow output from the nozzle 106 (labeled in FIG. 2). A first one of the two fluid circuits 110, 112 is a primary circuit 112, and a second one of the two fluid circuits 110, 112 is a secondary circuit 110. An electromagnetic device 114 is operatively connected to a hydromechancial valve spool 116 of the valve assembly 105 to selectively adjust position of the valve spool 116 of the valve assembly 104.

The valve spool 116 is biased to a closed position, i.e. it is biased to the left as oriented in FIG. 1, by one or more biasing members 118 of the scheduling valve assembly 104. The valve spool 116 is configured to regulate flow from the inlet 108 of the injector 102 to each of the primary and secondary circuits 110, 112. The valve spool 116 includes a scheduling surface 120 configured to vary flow area through the secondary circuit 112 based on position of the valve spool 116 within the scheduling valve assembly 104, i.e. as the valve spool 116 moves back and forth in the horizontal direction as oriented in FIG. 1. A scheduling valve with a scheduling surface is described in U.S. Pat. No. 5,732,730 which is incorporated by reference herein in its entirety.

The electromagnetic device 114 includes a permanent magnet 122 mounted on the valve spool 116. An electromagnet 124, e.g. electromagnetic coil, is mounted to the valve assembly 104 proximate to the permanent magnet 122 for selectively applying a force to the permanent magnet 122 to adjust position of the valve spool 116 within the valve assembly using electrical current applied to the electromagnet 124. The first permanent magnet 122 and the first electromagnet 124 are mounted proximate a downstream end of the valve assembly 104, i.e. to the right as oriented in FIG. 1. The electromagnetic device 114 includes a second permanent magnet 126 mounted to the valve spool 116 at a position upstream relative to the first permanent magnet 122, i.e. to the left as oriented in FIG. 1. A second electromagnet 128 is mounted to the valve assembly 104 proximate the second permanent magnet 126 at a position in the valve assembly upstream relative to the first electromagnet 124.

The first permanent magnet 122 and first electromagnet 124 have respective polarities and axial spacing relative to one another configured to pull the valve spool 116 toward a downstream direction, i.e. toward the right as oriented in FIG. 1, with application of DC current to the first electromagnet 114. The second permanent magnet 126 and second electromagnet 128 have respective polarities and axial spacing relative to one another configured to pull the valve spool 116 in an upstream direction, i.e. toward the left as oriented in FIG. 1, with application of DC current to the second electromagnet 128. Those skilled in the art will readily appreciate that this configuration allows for the position of the valve spool 116 within the valve assembly 104 to be adjusted to the left or the right as oriented in FIG. 1 to increase or decrease the flow rate through the fluid circuits 110, 112 depending on whether current is applied to the first or second electromagnets 124, 128. Those skilled in the art will readily appreciate that it is also possible to include only one electromagnet and permanent magnet if it is only desired to adjust the position of the valve spool 116 in one direction. A sensor 156 operatively connects the valve assembly 104 to a controller 154 (labeled in FIG. 4) of the electromagnetic device 114 to provide feedback of operational state of the valve assembly 104. Check valve features can be part of the metering valve assembly as described in U.S. Pat. No. 5,732,730, or separate as described here. The valve assembly 104 as shown in FIG. 1 is an integrated, check-schedule/meter valve.

Figure 2:
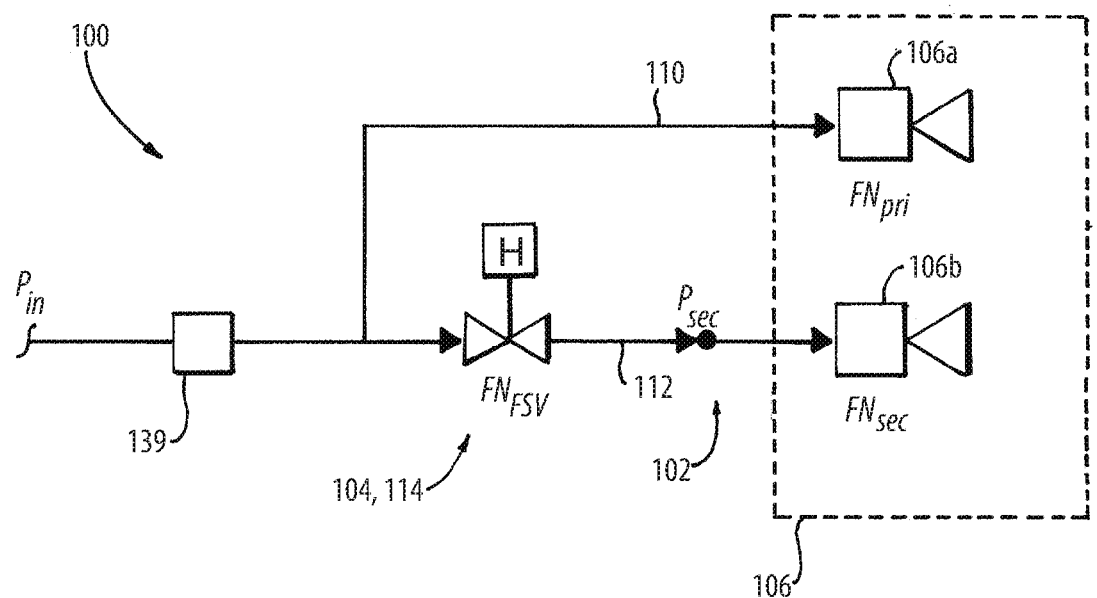
FIG. 2 is a schematic view of the system of FIG. 1, showing flow for the primary and secondary fluid circuits.

With reference now to FIG. 2, the injector 102 is shown schematically. Fuel supplied from a manifold at inlet pressure Pin can be regulated with the valve assembly 104. One or more check valves 139 can be included upstream or downstream of the valve assembly 104 to prevent leaking through the injector 102 when there is supposed to be no flow through the injector 102. The check valve 139 can be dedicated to the injector 102, or can be shared by several injectors 102. FIG. 2 shows the two fluid circuits 110, 112, and how the valve assembly 104 connects to the fluid circuits 110, 112. By using electrical control of the electromagnetic device 114 to regulate how much flow passes through the secondary circuit 112, this gives fine control over the valve assembly 104, especially for fine control over the secondary fluid circuit 112. Moreover, the electromagnetic device 114 can be sized to be smaller than is needed for full control authority over the valve spool 116 (labeled in FIG. 1), since the electromagnetic device 114 only needs to make adjustments to the position of the valve spool 116 of FIG. 1, which otherwise positions itself within the valve assembly 104 based on the pressure at the inlet 108 of the injector 102, Pin. In the event of electrical power outage for the electromagnetic device 114, there is no interference with the ordinary, passive operation of the valve spool 116 of FIG. 1.

Figure 3:
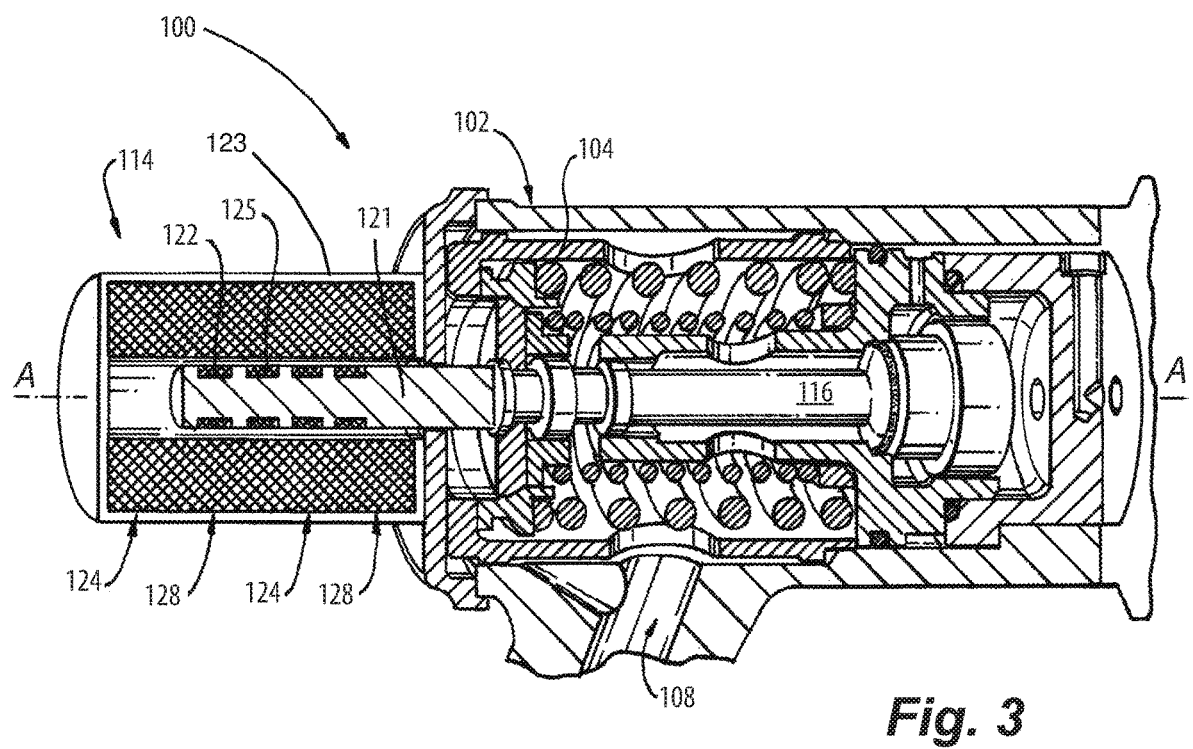
FIG. 3 is a schematic cross-sectional perspective view of another embodiment, showing a linear motor for the electromagnetic device.

With reference now to FIG. 3, another electromgantetic device 114 is shown, which can be used for adjustment of the valve spool 116 position. The electromagnetic device 114 includes a linear electromagnetic motor including a stator 123 mounted to stationary relative to the injector 102. The stator 123 includes a plurality of electromagnetic coils 124, 128 spaced apart from one another along a motion axis A of the valve spool 116. A linear rotor 121 is mounted to the valve spool 116. The linear rotor includes one or more permanent magnets 122, 125 positioned within the stator 123. The stator 123 and linear rotor 121 are positioned at an upstream end of the valve spool 116 (to the left as oriented in FIG. 3) and are configured to adjust position of the valve spool 116 within the valve assembly 104 based on electrical currents supplied to the plurality of electromagnetic coils 124, 128.

Figure 4:
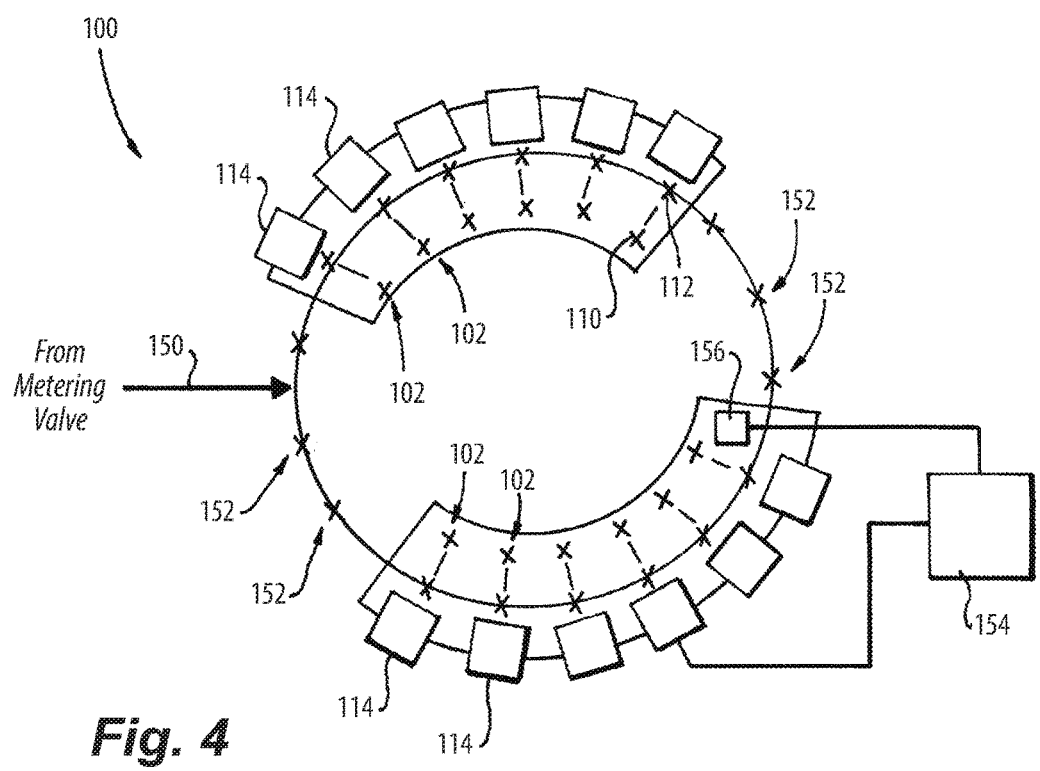
FIG. 4 is a schematic view of the system of FIG. 1, showing a plurality of injectors including passive and actuated nozzles distributed around a circumferential array, e.g. in a gas turbine engine.

With reference now to FIG. 4, the system 100 includes a plurality of duplex injectors 102, each with a solenoid valve 114 as shown in either FIG. 1 or 2. Each of the injectors 102 is connected in fluid communication with a single manifold 150 for supplying fuel to each injector 102 in the plurality of injectors 102 including the primary and secondary circuits 110, 112 of each injector 102. Another sub-set of injectors 152 are passive, simplex nozzles configured to issue fuel together with the secondary circuits 112 of the duplex injectors 102. Those skilled in the art will readily appreciate that the valves in the subject disclosure can be applied to simplex injectors to schedule the single circuit as well, and that all of the nozzles could be simplex or duplex without departing from the scope of this disclosure. A controller 154 is electrically connected to the electromagnetic devices 114 for individual control thereof (in FIG. 4, only one electromagnetic device 114 is shown connected to the controller 154 for sake of clarity in the drawing). It is also contemplated that the controller 154 can instead be electrically connected to the electromagnetic devices 114 for ganged control thereof, i.e. where all the electromagnetic devices 114 receive the same command from the controller 154. The first sub-set of injectors 102 is grouped circumferentially offset from the second sub-set of injectors 152. In FIG. 4, there are two groups of three passive simplex injectors 152, separated circumferentially from one another by two sets of six duplex, solenoid controlled injectors 102. Those skilled in the art will readily appreciate that this circumferential arrangement can be modified as needed for a given engine application, that control of the injectors 102 as described herein allows for finely tuned control of the flame in a combustor that is fed by the injectors 102, 152, and that the solenoid controlled and passive injectors described here are an example and this disclosure applies to any other suitable combination of passive/active injectors. The control can be based on sensor feedback from one or more sensors 156 in the system 100.

There are various potential benefits of systems and methods as disclosed herein, including the following. Failure modes of the solenoids add little if any additional risk for operation of the injectors. Loss (intentional or otherwise) of electrical power to the electromagnetic device causes the valve spool to return to a position determined by the mechanical components and regulates fuel flow as per the scheduling surface. Systems and methods as disclosed herein allow for removal of the engine flow divider valve and subsequent fuel manifolds, fittings, and the like, and allow both primary and secondary circuits to be supplied by a single manifold while still providing active control. The valve assemblies 104 (labeled in FIG. 1) of the injectors 102 can work as a system. For example, if one valve is set to reduce flow, others can be opened to increase flow to compensate. Incorporation of the one or more sensors 156, e.g. mass-flow sensors, pressure sensor(s), and/or position sensors, can allow for health monitoring and active flow control. The valves can be gradually actuated to minimize potential pressure spikes within the fuel system 100. The electromagnetic device and valve form a binary valve, a modulating valve, or a motorized valve, or any other suitable type of valve/electrical device can be used.

Additional potential benefits include the following. Fine control adjustment can be attained to perfectly match target flow profile. Calibration data can be loaded into controller specific to individual valve/nozzle and adjustments can be made from baseline position (i.e. where it would be with no correction) to target flow position. The electromagnetically controlled valves can compensate for manufacturing tolerances within the manifold and fuel system, or air maldistributions within the combustor. They can compensate for manifold pressure distribution (gravity). They can be dynamically adjust for rotated, inverted, or high-g conditions based on gravity sensor. Adjustments can be made during operation. This can be useful to compensate for different fuel properties (temperatures, viscosities). Adjustments can also made for deteriorating performance (internal carbon growth, piston wear). It is also contemplated that systems and methods as disclosed herein can be used to slightly actuate valve when engine is not operating, which can be useful for draining or filling a manifold, and for cleaning. Failure modes of the electromagnet follow original spring valve risks, which are known, so there is very little additional risk is added for this design.

Systems and methods as disclosed herein can reduce manufacturing cost and calibration time. Imperfections in the valve profile can be electronically compensated. This can also reduce tolerances needed in manifolds and combustors. Position sensors can be used to monitor pressure response, compared to long run data and determine product health, particularly injector tip fouling due to coking. Fine tune attenuation can be used for noise or combustor uniformity through use of turbine feedback. The electromagnetically controlled valves can work together as a system. If one valve is set to reduce flow, others can be opened to increase flow to compensate. Air or fuel maldistribution can be measured by temperature sensors in the turbine vane, and this information can be feed back to the valves to compensate. Combustor casing pressure transducers can detect combustion acoustic modes which are undesirable. This can be used to trigger adjustment of the valves to redistribute fuel within the system to avoid the acoustic mode.

The methods and systems of the present disclosure, as described above and shown in the drawings, provide for adjustment of otherwise passive valves, e.g. to provide active patternation in fuel injection for gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   an injector including a scheduling valve assembly and a nozzle in fluid communication with the scheduling valve assembly, wherein the scheduling valve assembly is configured for regulation of flow from an inlet of the injector to the nozzle; and
   an electromagnetic device operatively connected to a hydromechanical valve spool of the scheduling valve assembly to selectively adjust position of the hydromechanical valve spool in the scheduling valve assembly;
   wherein the electromagnetic device includes:
   a first permanent magnet mounted on the hydromechanical valve spool; and
   a first electromagnet mounted to the scheduling valve assembly proximate to the first permanent magnet for selectively applying a force to the first permanent magnet to adjust position of the hydromechanical valve spool within the scheduling valve assembly;
   a second permanent magnet mounted to the hydromechanical valve spool at a position upstream relative to the first permanent magnet; and
   a second electromagnet mounted to the scheduling valve assembly proximate the second permanent magnet at a position in the hydromechanical valve assembly upstream relative to the first electromagnet;
   wherein the first permanent magnet and the first electromagnet are mounted proximate a downstream end of the scheduling valve assembly.

2. The system as recited in claim 1, wherein the injector includes two fluid circuits between the inlet of the injector and two respective outlets of the nozzle for staged flow output from the nozzle, wherein a first one of the two fluid circuits is a primary circuit, and wherein a second one of the two fluid circuits is a secondary circuit.

3. The system as recited in claim 2, wherein the hydromechanical valve spool is biased to a closed position by one or more biasing members of the scheduling valve assembly, wherein the hydromechanical valve spool is configured to regulate flow from the inlet of the injector to each of the primary and secondary circuits, and wherein the hydromechanical valve spool includes a scheduling surface configured to vary flow area through the secondary circuit based on position of the hydromechanical valve spool within the scheduling valve assembly.

4. The system as recited in claim 2, wherein the injector is a first injector in a plurality of injectors each connected in fluid communication with a single manifold for supplying fuel to each injector in the plurality of injectors.

5. The system as recited in claim 4, wherein a first sub-set of the plurality of injectors are passive, simplex nozzles configured to issue fuel together with the secondary circuit of the first injector.

6. The system as recited in claim 5, wherein the first injector is in a second sub-set of the plurality of injectors, wherein each injector in the second sub-set is as recited in claim 1 including a respective electromagnetic device as recited in claim 1 connected thereto.

7. The system as recited in claim 6, further comprising a controller electrically connected to the electromagnetic devices for individual control thereof.

8. The system as recited in claim 6, further comprising a controller electrically connected to the electromagnetic devices for ganged control thereof.

9. The system as recited in claim 6, wherein the first sub-set of injectors is grouped circumferentially offset from the second sub-set of injectors.

10. The system as recited in claim 1, wherein the first permanent magnet and first electromagnet have respective polarities and axial spacing relative to one another configured to pull the hydromechanical valve spool toward a downstream direction with application of DC current to the first electromagnet.

11. The system as recited in claim 10, wherein the second permanent magnet and second electromagnet have respective polarities and axial spacing relative to one another configured to pull the hydromechanical valve spool in an upstream direction with application of DC current to the second electromagnet.

12. The system as recited in claim 1, further comprising a sensor operatively connecting the scheduling valve assembly to a controller of the electromagnetic device to provide feedback of an operational state of the scheduling valve assembly.

13. The system as recited in claim 1, wherein the electromagnetic device and the hydromechanical valve spool form a binary valve.

14. The system as recited in claim 1, wherein the electromagnetic device and the hydromechanical valve spool form a modulating valve.

15. The system as recited in claim 1, wherein the electromagnetic device and the hydromechanical valve spool form a motorized valve.

16. The system as recited in claim 1, wherein loss of electrical power to the electromagnetic device causes the hydromechanical valve spool to return to a position determined by mechanical components and regulates fuel flow as per a scheduling surface.

* * * * *